May 1, 1928.
P. N. SWANSON
FARM GATE
Filed June 24, 1927
1,668,344
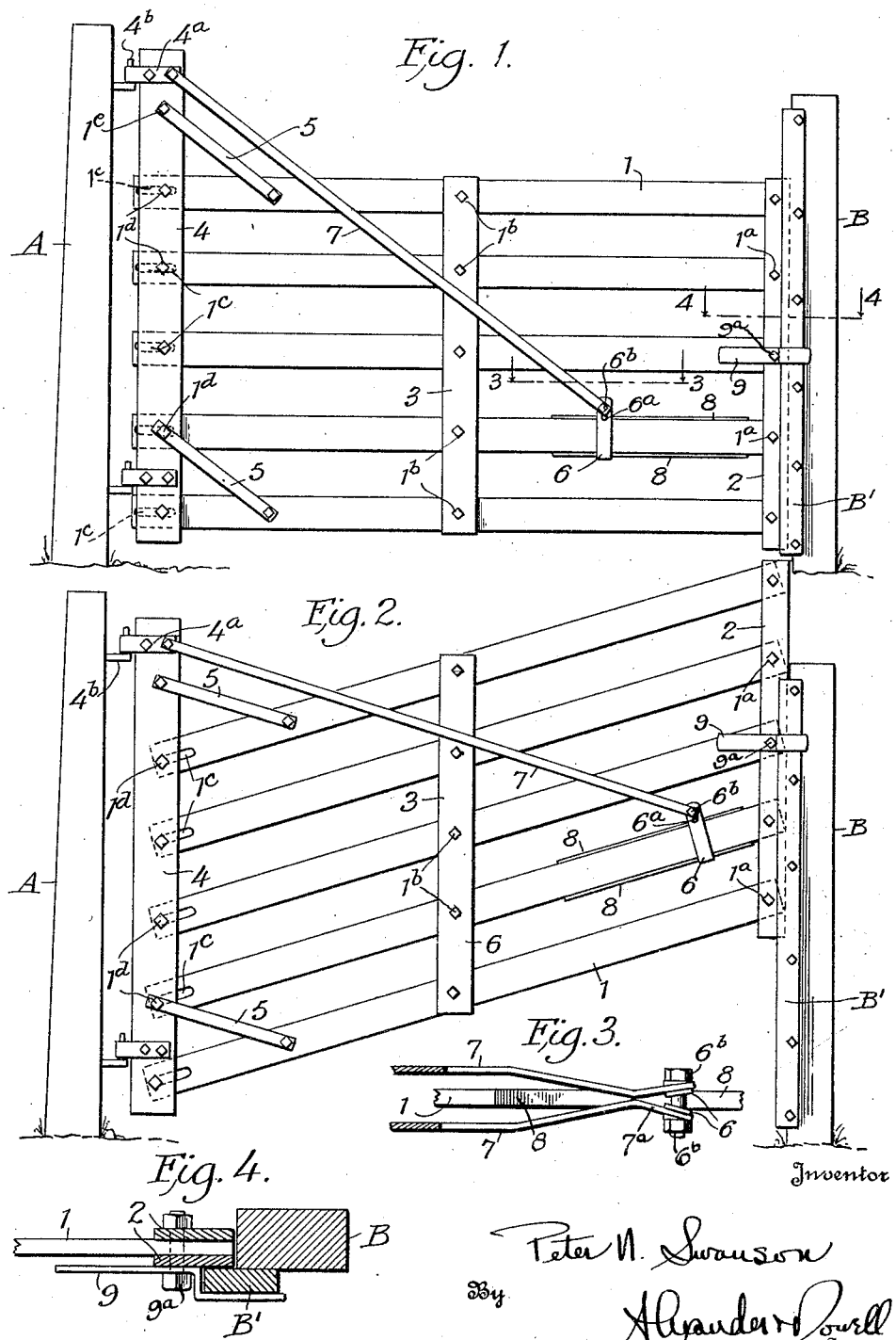
Inventor
Peter N. Swanson
By Alexander Dowell
Attorneys Patented May 1, 1928.

1,668,344

UNITED STATES PATENT OFFICE.

PETER N. SWANSON, OF KEWANEE, ILLINOIS.

FARM GATE.

Application filed June 24, 1927. Serial No. 201,082.

This invention is a novel improvement in farm gates, and the principal object thereof is to provide a simple novel and efficient farm gate adapted to be mounted on a vertical pivot, the outer end of the gate being adjustable in a vertical plane to permit small live-stock to pass thereunder from one side of the gate to the other while restraining large livestock from passing the gate; novel means being provided for compensating for the otherwise foreshortening of the gate when adjusted vertically so that the overall length of the gate remains substantially constant within the usual working limits of vertical adjustment.

The gate can also be adjusted vertically to conform with the lay of the land, whether sloping up hill or down hill; or can be adjusted to compensate for sagging of the outer end of the gate.

Other minor objects will be hereinafter set forth.

I will explain the invention with reference to the accompanying drawing which illustrates one practical embodiment thereof to enable others to adopt and use the same; and will summarize in the claims the novel features of construction, and novel combinations of parts, for which protection is desired.

In said drawings:—

Fig. 1 is a side elevation of the gate showing same in normal position.

Fig. 2 is a similar view showing the gate in vertically adjusted position.

Fig. 3 is a section on the line 3—3, Fig. 1.

Fig. 4 is a section on the line 4—4, Fig. 1.

As shown in the drawing, my novel gate preferably comprises a plurality of spaced horizontal bars 1, five such bars being shown, all of the bars 1 being of same length and pivotally connected at their outer ends by bolts $1^a$ or the like to a pair of outer cross bars 2, and also pivotally connected as at $1^b$ to a pair of center cross bars 3 whereby the normally rectangular frame comprising bars 1, and cross bars 2 and 3 may be readily distorted but the bars 1 and cross bars 2 and 3 will respectively remain parallel at all times.

At the inner end of each bar 1 is an elongated slot $1^c$ adapted to receive a bolt or pin $1^d$ passing through a pair of inner cross members 4 whereby the bars 1 may have a certain amount of movement towards or away from the cross-members 4 for the purpose hereinafter set forth.

The cross members 4 extend above the upper gate bar 1, and are hingedly connected at its upper and lower ends to a hinge-post A, preferably by means of hinge straps $4^a$ on members 4 engaging the pintles $4^b$ which are set into hinge post A in any desired manner.

For the purpose of compensating for the otherwise foreshortening of the gate when the outer end thereof is adjusted vertically, as shown in Fig. 2, and to maintain substantially the same overall length for the gate, I provide two pairs of angularly disposed straps 5 which are pivotally attached to the upper and lower bars 1 of the gate adjacent their inner ends, said straps 5 being of same length and pivoted to the bars 1 the same distance from cross members 4, and sloping upwardly and inwardly at the same angle to meet the cross-members 4 and being pivotally connected thereto. The lower pair of straps 5 may conveniently have their inner or upper ends pivoted on the bolt or pin $1^d$ for the next to lowest bar 1, while the upper pair of straps 5 are pivoted at their inner upper ends to a bolt $1^e$ passing through cross-members 4. By reason of the inclination of straps 5, when the outer end of the gate is raised into position shown in Fig. 2 to permit small live-stock to pass under the gate the otherwise foreshortening of the gate is compensated for by the action of the pairs of straps 5 which push all the bars 1 outwardly from cross-members 4, permitted by the slotted connection of bars 1 to the cross-members 4; Also when the gate is again lowered into position shown in Fig. 1 the pairs of straps 5 will redraw the bars 1 a corresponding distance towards the cross-members 4, and hence a substantially constant clearance is always maintained between the latch post B and the outer cross bars 2.

The means for holding the gate in adjusted position comprises a U-shaped strap iron 6 adapted to fit under one of the bars 1 between cross bars 2 and 3 to form a clamp. The outer ends of clamp 6 extend above bar 1 and are provided with two pairs of opposed openings disposed one above the other and adapted to receive clamping bolts $6^a$ and $6^b$. Connected to the upper bolt $6^b$ is a pair of straps 7 extending upwardly and inwardly and pivoted on one of the bolts passing through the upper hinge strap 4ª. The lower ends of straps 7 are bowed outwardly, as at 7ª in Fig. 3, so that when bolt 6ᵇ is tightened the upper ends of clamp 6 will be squeezed together to pinch the clamp around the bar 1 to prevent slipping of the clamp on the bar. Preferably metallic strips 8 are secured to the upper and lower edges of the bar 1 in way of clamp 6 to prevent the clamp from actually cutting into the bar.

The use of adjustable clamp 6 obviates the necessity of the usual notches or bolt holes in bar 1 for anchoring the lower ends of straps 7, and permits a finer vertical adjustment of the gate when compensating for sagging of the outer end of the gate.

Latch post B is provided with a backing strip B' secured adjacent to its edge against which the gate may slam in closing and a latch is provided on the gate for locking same to the strip B'. As shown the lock comprises a strip 9 having a perforation therein for a pivot bolt 9ª, the outer end of the strip projecting beyond the front edge of cross bar 2 and being bent to fit around the adjacent faces of strip B'. Any other type of latch however may be used, which will similarly engage the strip B' for any vertical adjustment of the gate.

I do not limit my invention to the exact form shown in the drawing for obviously changes may be made therein within the scope of the claims.

I claim:—

1. A farm gate comprising bars and cross bars connected together on horizontal pivots; a cross member at the inner ends of the bars adapted to be pivoted to a hinge post; and means connecting the bars with the cross member whereby as the outer end of the bars are raised they will be shifted outwardly to compensate for the otherwise foreshortening of the gate.

2. In a gate as set forth in claim 1, the bars having a sliding connection with the cross member; and said means comprising diagonally disposed straps pivotally connecting the bars and member.

3. A farm gate comprising bars and cross bars connected together on horizontal pivots; a cross member having a sliding connection with the inner ends of the bars and adapted to be pivoted to a hinge post; and diagonally disposed straps pivotally connecting the bars with the cross member whereby as the outer end of the gate is raised the bars will be shifted outwardly to compensate for the otherwise foreshortening of the gate.

4. A farm gate comprising a plurality of parallel bars; cross bars pivotally connected to the parallel bars; a cross member at the inner ends of the parallel bars adapted to be pivoted to a hinge post; said parallel bars having elongated slots therein at their inner ends; pins on the cross member engaging the slots; and means connecting the parallel bars with the cross member whereby as the outer end of the gate is raised the parallel bars will be shifted outwardly to compensate for the otherwise foreshortening of the gate.

5. A farm gate comprising a plurality of parallel bars; cross bars pivotally connected to the parallel bars; a cross member at the inner ends of the parallel bars adapted to be pivoted to a hinge post; said parallel bars having elongated slots therein at their inner ends; pins on the cross member engaging the slots; and diagonally disposed straps pivotally connecting the parallel bars adjacent their inner ends with the cross member whereby as the outer end of the gate is raised the parallel bars will be shifted outwardly to compensate for the otherwise foreshortening of the gate.

6. A farm gate comprising a plurality of bars; cross bars pivotally connected to the parallel bars; a cross member at the inner ends of the bars adapted to be pivoted to a hinge post; a pair of straps on the upper end of the cross member and at opposite sides of the gate; a U-shaped member adapted to fit under said bar and extending above the bar; a pair of bolts transfixing the upper end of the U-shaped member above the bar; the lower ends of the straps being connected to one of the said bolts; and the lower ends of the straps being bent outwardly to pinch the upper ends of the U-shaped member together around the bar when the bolt is tightened.

7. In combination with a gate as set forth in claim 1, a clamp slidably engaging one of said bars and having opposed legs extending above the bar; a bolt transfixing the outer ends of said legs; and a pair of straps connecting the bolt and the upper end of the cross member at opposite sides of the gate, the ends of the straps adjacent the bolt being bent outwardly to pinch the legs against the bar when the bolt is tightened.

8. In combination with a gate as set forth in claim 3, a U-shaped clamp slidably engaging one of said bars, the legs of said clamp extending above the bar, a bolt transfixing the outer ends of said legs; and a pair of straps at opposite sides of the gate connecting the bolt with the upper end of the cross member, the ends of the straps adjacent the bolt being bent outwardly to pinch the legs against the bar when the bolt is tightened.

9. In combination with a gate as set forth in claim 4, a resilient U-shaped clamp slidably engaging one of said bars, the legs of said clamp extending above the bar, a bolt transfixing the outer ends of said legs; and a pair of straps at opposite sides of the gate connecting the bolt with the upper end of the cross member, the ends of the straps adjacent the bolt being bent outwardly to pinch the legs against the bar when the bolt is tightened.

10. In combination with a gate as set forth in claim 5, a resilient U-shaped clamp slidably engaging one of said bars, the legs of said clamp extending above the bar, a bolt transfixing the outer ends of said legs; and a pair of straps connecting the bolt with the upper end of the cross member, the ends of the straps adjacent the bolt being bent outwardly to pinch the legs against the bar when the bolt is tightened.

11. A farm gate comprising a plurality of parallel bars; cross bars pivotally connected to the parallel bars; a cross member at the inner ends of the bars adapted to be pivoted to a hinge post; a U-shaped clamp slidably engaging one of said bars the legs of said clamp extending above the bar; a bolt transfixing the outer ends of said legs; and a pair of straps connecting the bolt with the upper end of the cross member, the ends of the straps adjacent the bolt being bent outwardly to pinch the legs against the bar when the bolt is tightened.

In testimony that I claim the foregoing as my own, I affix my signature.

PETER N. SWANSON.